Figure 1:
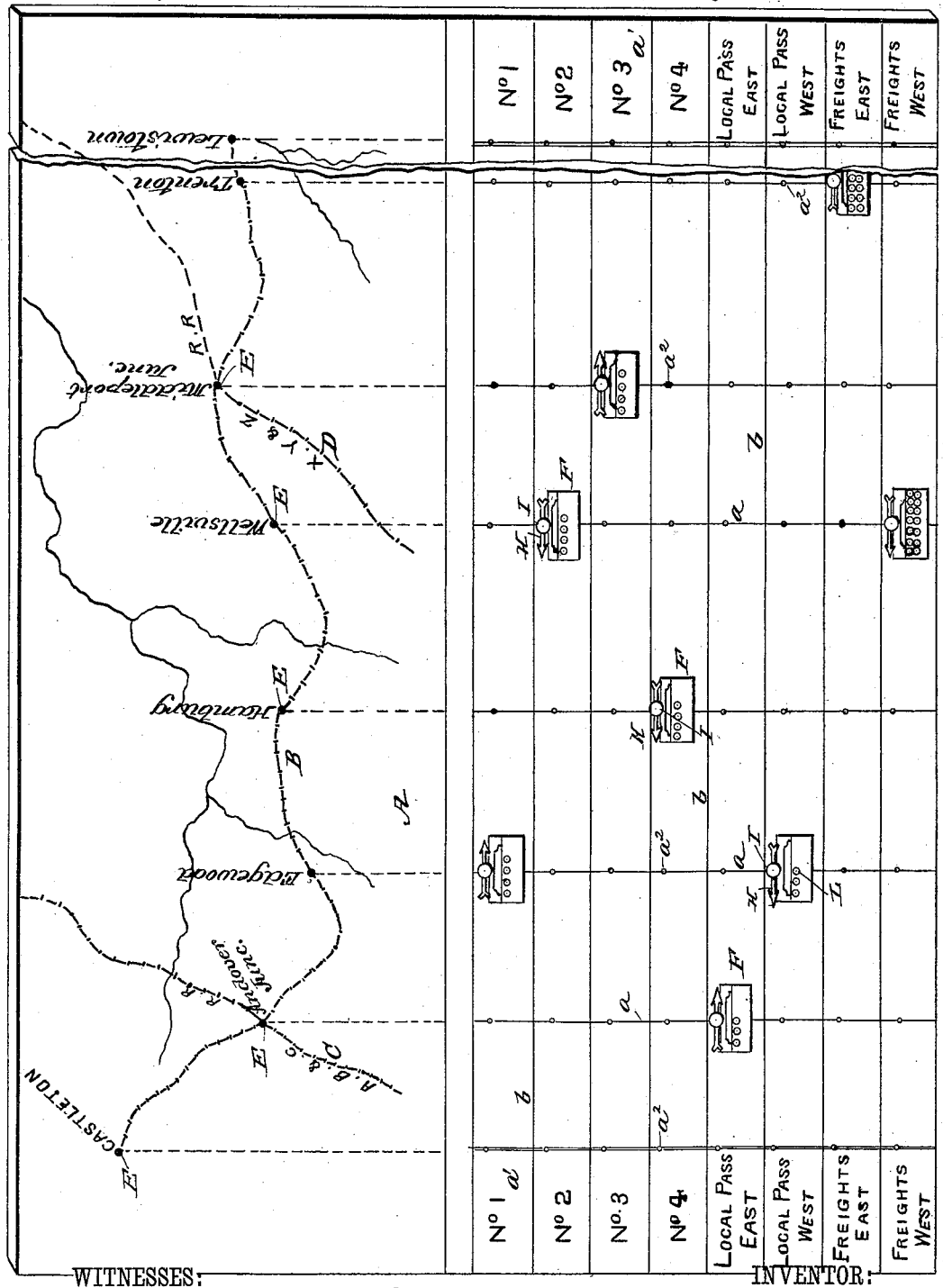

(No Model.) 4 Sheets—Sheet 1.

J. T. ODELL & T. J. DE LAMERE.
RAILROAD TRAIN INDICATOR.

No. 407,548. Patented July 23, 1889.

WITNESSES:
Fred G. Dieterich
Jos. A. Ryan

INVENTOR:
J. T. Odell
T. J. DeLamere
BY
ATTORNEYS.

(No Model.) 4 Sheets—Sheet 2.

J. T. ODELL & T. J. DE LAMERE.
RAILROAD TRAIN INDICATOR.

No. 407,548. Patented July 23, 1889.

COLOR REFERENCE
- RUSH
- MERCHANDISE
- GRAIN
- LIVE STOCK
- LOGS & LUMBER
- COTTEN
- TOBACCO

WITNESSES:
Fred G. Dieterich
Jos. A. Ryan

INVENTOR:
J. T. Odell
T. J. De Lamere
BY Munn & Co
ATTORNEYS.

(No Model.) 4 Sheets—Sheet 3.

J. T. ODELL & T. J. DE LAMERE.
RAILROAD TRAIN INDICATOR.

No. 407,548. Patented July 23, 1889.

WITNESSES:
Fred G. Dieterich
Jos. A. Ryan

INVENTOR:
J. T. Odell
T. J. De Lamere
BY
Munn & Co.
ATTORNEYS.

(No Model.) 4 Sheets—Sheet 4.

J. T. ODELL & T. J. DE LAMERE.
RAILROAD TRAIN INDICATOR.

No. 407,548. Patented July 23, 1889.

*Fig. 6.*

PASSENGER & FREIGHT EQUIPMENT

| | PASSENGER | | | | | | | | FREIGHT | | | | | | |
|---|---|---|---|---|---|---|---|---|---|---|---|---|---|---|---|
| | M.&E. | B.&E. | COMB. | 1st C. Chs | 2nd C. Chs | 3rd C. Chs | OBS | SLEEPERS | BUS. | TOTAL | | | | | TOTAL |
| | | | | | | | | | | | Box. | Misc'l. | S.D. St'k | D.D. St'k | Flats | 4 Wh. Coal | 10 Ton Hop | H.B. Gond | F.B. Gond | COKE | |
| TOTAL | | | | | | | | | | | | | | | |
| IN SHOPS | | | | | | | | | | | | | | | |
| DETACHED SERVICE | | | | | | | | | | | | | | | |
| ON FOREIGN ROADS | | | | | | | | | | | | | | | |
| TOTAL | | | | | | | | | | | | | | | |
| TOTAL AVAILABLE | | | | | | | | | | | | | | | |

LOCATION of AVAILABLE FREIGHT EQUIPMENT

| DIVISIONS | Box. | Misc'l. | S.D. St'k | D.D. St'k | Flats | 4 Wh. Coal | 70 Ton Hop | H.B. Gond | F.B. Gond | COKE | TOTAL |
|---|---|---|---|---|---|---|---|---|---|---|---|
| | | | | | | | | | | | |
| TOTAL | | | | | | | | | | | |

LOCATION of FOREIGN CARS

| DIVISIONS | BOX | Misc'l | S.D. St'k | D.D. St'k | Flats | 4 Ton Coal | 20 Ton Hop | H.B. Gond | F.B. Gond | COKE | TOTAL |
|---|---|---|---|---|---|---|---|---|---|---|---|
| | | | | | | | | | | | |
| TOTAL | | | | | | | | | | | |

WITNESSES:
Fred G. Dieterich
Jos. A. Ryan

INVENTOR:
J. T. Odell
T. J. De Lamere
BY
ATTORNEYS.

UNITED STATES PATENT OFFICE.

JABEZ T. ODELL, OF RICHMOND, VIRGINIA, AND THOMAS J. DE LAMERE, OF ST. PAUL, MINNESOTA.

RAILROAD-TRAIN INDICATOR.

SPECIFICATION forming part of Letters Patent No. 407,548, dated July 23, 1889.

Application filed February 9, 1889. Serial No. 299,257. (No model.)

*To all whom it may concern:*

Be it known that we, JABEZ T. ODELL, of Richmond, in the county of Henrico and State of Virginia, and THOMAS J. DE LAMERE, of St. Paul, in the county of Ramsey and State of Minnesota, have invented a new and useful Improvement in Railroad-Train Indicators, of which the following is a specification.

Our invention consists in a new and improved railroad-train indicator, which will be hereinafter fully described and claimed.

The object of this invention is to enable the person in charge of the transportation on a railroad to have and keep before him on a large board accurate and compact indicators of all the trains moving on his road, so that he can by looking at the board see at a glance all trains moving on his road, their location, the number of cars in each train, the contents of each car, the number and initials of each car, and can also see whether a train is on time or not.

Figures 2, 3:
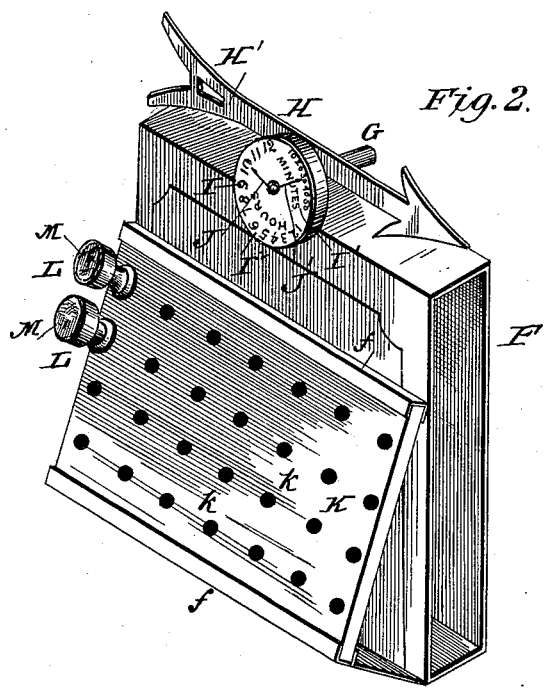
Figure 4:
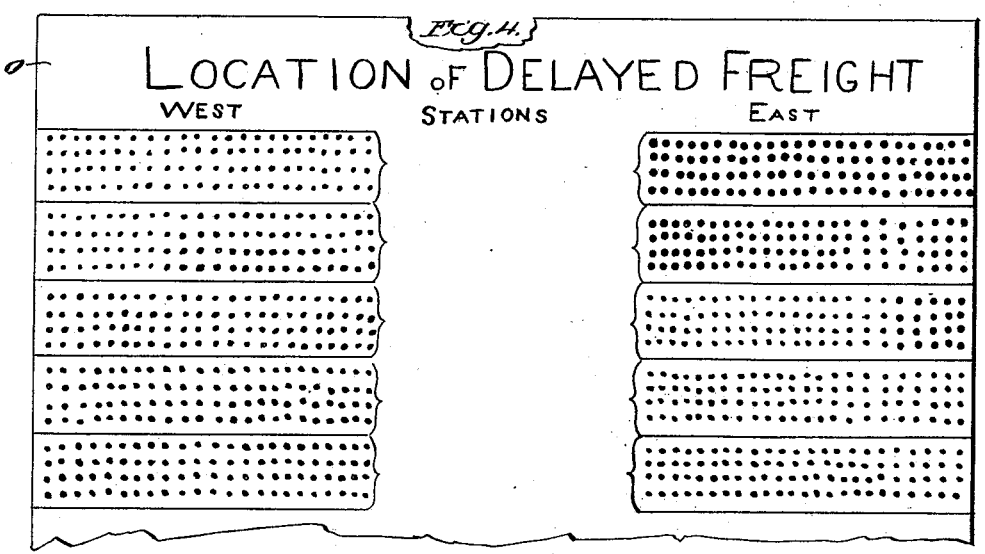
Figure 5:
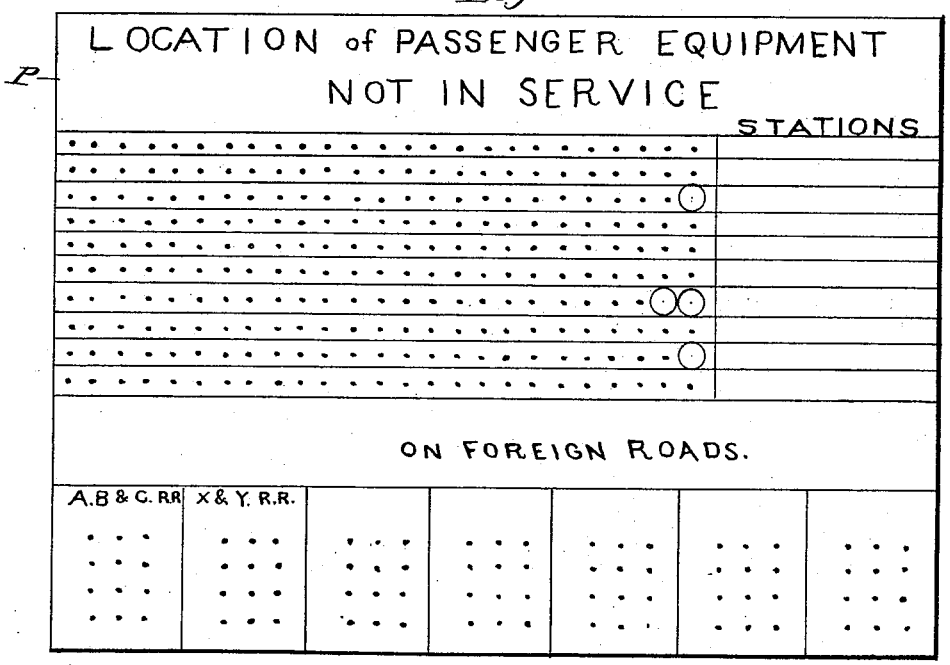
Figure 7:

Referring to the accompanying drawings, Figure 1 is a plan view of the main board of our invention, on which the position, &c., of all equipment in service is shown. Fig. 2 is a perspective view, on an enlarged scale, of one of the movable indicator-boxes. Fig. 3 is a plan view of the color-reference chart. Fig. 4 is a plan view of the auxiliary board, on which the location of delayed freight is shown. Figs. 5 and 6 are similar views of auxiliary boards, on which are shown the location of all passenger and freight equipment not in service; and Fig. 7 is a view of one of the small tags or cards, on which the time of a train as it passes each station is marked.

The same letters of reference indicate corresponding parts in all the figures.

Referring to the several parts by letter, A indicates the main board of our invention, on which is shown the location, &c., of all trains in motion on the road, this board, for use on a road of, for example, six hundred and eighty-three miles, on which an average of twelve hundred trains are moved per week, being about eighteen feet long and twelve feet high. The exact size of the board is, of course, a matter of no moment. On the upper portion of this board is placed a representation of the line of railroad, indicated in the drawings by the line B, the lines C and D indicating connecting-lines of other railroads, which it is valuable to have on the board A in routing cars.

At E are indicated the several telegraph-stations about thirty to forty miles apart on the line B, designating-names being given to the several stations on the drawings, running from Castleton to Lewistown. Below this upper part the board A is divided by horizontal lines $b$ and vertical lines $a$, the vertical lines $a$ being immediately below in line with the stations E. In the spaces $a'$ at each end of the board the names or designating-numerals of the trains are written. Below the telegraph-stations E at $a^2$ are formed the holes in which the retaining-pegs of the movable indicator-boxes fit.

F indicates one of the movable indicator-boxes, to the top of which is secured a transverse peg G, which will fit in any of the holes $a^2$. Upon this peg is secured an arrow H, which indicates the direction in which the train is moving and upon which at H' is placed the number of the train. Upon the front or outer end of the peg G of each box is a disk or dial I, upon which are marked the hours and minutes, as shown. The dial is provided with two movable hands J and J', which can be moved to show by the figures I' I² on the dial the number of hours and minutes that the train is late. Below the dial on the front of the box F are grooved ways $f f$, in which a thin plate or strip K, which may be of wood, fits. This strip is of such a length and has formed in it as many holes $k$ as may be necessary to indicate the number of cars in a train. In these holes $k$ fit pegs L, having flat heads on which a wafer M can be readily stuck. These pegs represent the cars in a train, and the color of the wafer stuck on each peg-head indicates the contents of that car, according to a color-chart, which will be explained below, while on each wafer, when stuck on the peg, are written the number and initials of the car and its destination.

The color-chart above referred to is illustrated in Fig. 3 of the drawings, circles of colors N, the colors of which are indicated by name on the accompanying drawings, being painted one below the other on the board, while opposite each color is written the name of the thing that color is here used to indicate. Thus green indicates merchandise; yellow, grain, and so on.

The wafers M are of the same colors as the colors N on the color-chart, and the wafer stuck on the head of each peg L is of the same color as the color on the chart, which indicates the contents of that car. Thus if a car is filled with merchandise, the color on the chart used to represent merchandise being yellow, a wafer of yellow color is stuck on the head of the peg L representing that car to indicate at a glance the contents of that particular car.

To illustrate the operation, which requires a large amount of telegraphing, which, however, is simplified and shortened by the use of a series of copyrighted telegraphic forms, suppose passenger-train No. 1 leaves Castleton, the western terminus shown in Fig. 1 in the drawings, having mail-car No. 1, express and baggage car No. 2, coach 99, and coach 100. The conductor of this train, before leaving Castleton, fills up the blank showing what cars he has in his train, and the operator at Castleton telegraphs this information to the superintendent of transportation. The clerk in charge of the board A takes a box F, puts in it the requisite number of pegs L—four in the above case, as there are four cars with white wafers on them—writes on each wafer the number and initial of its car, and sticks the peg G of the box in the hole $a^2$ under Castleton. The pegs L for representing passenger-cars can be painted white and used over and over. When this train No. 1 passes the next station—here called "Andover Junction"—if it is on time the telegraph-operator at that station wires the fact to the superintendent of transportation, and the message, which is received on a particular form, is placed in the box F.

If the train be delayed before reaching Edgewood, the next station, when it passes that station the extent of the delay is telegraphed and the cause, and that dispatch is placed in the box F, and so on to the end of the run. When the train is late in arriving at any station, the hands J and J' are moved over the scales I' and I², so as to indicate on the dial I the exact time which the train is late.

In the case of a freight-train, the yard-master at district and divisional terminals makes a list of the cars by number and initials and contents, which is wired to the superintendent of transportation, and the clerk in charge of the board A places pegs L in a box F to show the number of cars in the train. The number of the train is shown on the arrow H, which also shows the direction in which the train is running. The color of the wafers placed on the pegs shows the contents of each car, while on each wafer are written the number and initials and also the destination of that car which the peg represents. This train is then reported as it passes each telegraph-station, designated as a reporting-station, and any delay shown and the cause, the dispatches or telegrams being kept in the box F.

In Fig. 7 is shown a small tag R, one of which is placed by each hole $a^2$ in the main board A, and on which the time of a train at each station is marked, this saving the trouble of referring to the time-card for the time of each train. In combination with the board A we employ auxiliary boards O, P, and Q, the board O (shown in Fig. 4 of the drawings) serving to show the location of delayed freight, the board P (shown in Fig. 5) showing the location of passenger-equipment not in service, while the board Q (shown in Fig. 6) shows the total passenger and freight equipment and the location of available freight-equipment and foreign cars.

Some of the advantages of this invention are as follows: The clerk or superintendent of transportation can tell by a glance the exact number of cars moving on the road, the exact location of any particular car, the contents of each car, and the number of cars of different kinds of freight. Instead of taking several days to find if a particular car which left a point off your road destined for a point on your road has come on your road, and, if so, where it is, the information can be obtained in a few minutes. If a car breaks down and has to be side-tracked, the fact is reported by the conductor, telegraphed from the nearest station, when the peg L representing the car is removed from the box F and stuck in the board O (shown in Fig. 4) opposite the name of the station at which it is left. A car-load of merchandise has been received and agreed to be put through in a certain time. This is called "rush freight," and will be indicated by a peg one half of the wafer on which is of the proper color to show the nature of the commodity, according to the chart, Fig. 3, while the other half of the wafer is red. That car cannot be delayed one hour at any point without the superintendent of transportation knowing it, and he will consequently be in a position to forward it, if possible.

This system of handling cars has been in practical operation for over a year and has been found satisfactory in every particular, and, as stated before, has worked perfectly with an average of twelve hundred trains per week and at a great saving of cost. The time taken by the clerk in charge of the board in making up a train of thirty-five cars is only about five minutes. The business of handling cars is much simplified, and accurate information as to the location of any car moving on the road can be obtained in a minute or two. For example, the number of cars of cotton and their location can be ascertained as quickly as they can be counted. Again, the traffic department asks to have a particular car stopped, and, instead of a long tracing to find out where the car is, in five minutes a telegram is in the hands of the division superintendent stopping the car and telling him what train it is in and where that train is to within thirty miles, designating the number and initials of the car.

The auxiliary boards O, P, and Q (shown in Figs. 4, 5, and 6) together show the location of all passenger and freight equipment not in service, and a sudden call for extra passenger or freight equipment can be provided for as quickly as the message can be written. All equipment in service is shown on the main board A.

Having thus described our invention, what we claim, and desire to secure by Letters Patent, is—

1. The combination, with the indicator-board formed with the series of apertures, of the movable indicator-box having a transverse retaining-peg and a series of apertures at its forward side and the removable pegs fitting in said holes, substantially as set forth.

2. The combination, with the indicator-board formed with the series of apertures, of the movable indicator-box having a transverse retaining-peg and a series of apertures at its forward side and removable pegs having the wafers affixed to them, substantially as set forth.

3. The combination, with the indicator-board formed with the series of apertures, of the movable indicator-box having a transverse retaining-pin, a removable slide at the front of said box, having a series of apertures, and removable pegs fitting in said apertures.

4. The combination, with the indicator-board formed with the series of apertures, of an indicator-box having a transverse retaining-peg, an arrow indicating the direction in which the train is running, a slide formed with a series of apertures, and removable pegs fitting said apertures.

5. The combination, with the indicator-board formed with the series of apertures, of an indicator-box having a transverse retaining-peg, an arrow indicating the direction in which the train is running, a slide formed with a series of apertures, removable pegs fitting said apertures, and the different colored wafers adapted to be attached to said pegs.

6. The combination, with the indicator-board formed with the series of apertures, of an indicator-box having the transverse retaining-peg, the arrow, the dial marked with hours and minutes and having the movable hands, the grooved ways and the perforated slide fitting therein, the removable pegs, and the wafers, substantially as set forth.

7. A train-indicator comprising the main board having upon its upper part a representation of a railroad-line and the telegraph-stations thereon and having apertures arranged below said stations, and movable boxes having retaining-pegs to fit said apertures and having apertures at their forward sides, and indicator-pegs fitting in said apertures.

8. In a train-indicator, the combination of the main board marked with the lines and stations and having the series of apertures below said stations, and the side spaces in which the names of the trains are placed, and the indicator-boxes formed each with the retaining-peg, the arrow, the dial marked with hours and minutes and having the movable hands, the grooved ways and the perforated slide fitting therein, the removable pegs, and the wafers, substantially as set forth.

9. The combination, with the indicator-board, of the movable indicator-boxes and the movable car-indicating pegs L, the series of colored wafers adapted to be attached to the car-indicating pegs L, and the color-reference chart having the reference-colors N upon it, substantially as set forth.

10. In a train-indicator, the combination, with the indicator-board formed with the apertures $a^2$, in which the retaining-pegs of the movable indicator-boxes fit, and the movable indicator-boxes, of the flat paper tags R, adapted to be secured by the apertures $a^2$, substantially as set forth.

JABEZ T. ODELL.
THOMAS J. DE LAMERE.

Witnesses to the signature of Odell:
M. A. POWERS,
J. B. GENTERS, Jr.
Witnesses to the signature of De Lamere:
P. J. WRIGHT,
C. C. TROTT.